March 5, 1963 J. R. DAVEY ETAL 3,080,524

LINEAR AUTOMATIC VOLUME CONTROL SYSTEM

Filed Jan. 10, 1961

INVENTORS: J. R. DAVEY
J. S. ENGEL
M. A. FLAVIN

BY [signature]

ATTORNEY

United States Patent Office 3,080,524

Patented Mar. 5, 1963

3,080,524

LINEAR AUTOMATIC VOLUME CONTROL SYSTEM

James R. Davey, Franklin Township, Somerset County, Joel S. Engel, Fort Lee, and Michael A. Flavin, North Plainfield, N.J., assignors to Bell Telephone Laboratories, Incorporated, New York, N.Y., a corporation of New York Filed Jan. 10, 1961, Ser. No. 81,852
7 Claims. (Cl. 325—187)

This invention relates to an automatic volume control system, and in particular it relates to such a system which has an essentially linear transmission characteristic.

Numerous automatic volume control system are known in the art, but it is also known that the prior art systems usually depend for operation upon a circuit device which has a nonlinear transmission characteristic. Such nonlinearity results from the fact that the gain through the device is controlled by varying the device operating point by changes in device bias. If these prior art volume control systems are to be employed with broad band signals, the signal variation must be kept small compared to the bias variation range in order to limit the generation of harmonics; for harmonics of low frequencies in the signal band may fall within higher frequency portions of the band.

When it becomes necessary to employ automatic volume control in a signal transmission system that is required to handle a relatively broad band of frequencies, the circuits which are required to approximate a linear transmission characteristic become burdensome and elaborate, and involve complex design problems. Multichannel, frequency multiplexed, data, transmission systems are becoming increasingly popular; and in such systems a relatively broad band automatic volume control system is highly advantageous.

It is, therefore, one object of this invention to control the volume of an electrical signal in a manner which substantially maintains linear transmission.

It is another object to vary the volume of an electrical signal by automatic means without adjusting the operating point of signal path transmission devices.

These objects, as well as others, are achieved in an illustrative embodiment of the invention in which data signals are amplitude modulated on a pulse train of fixed frequency, and the modulation production is passed through an integrating filter. The filter output is applied to appropriate utilization means, and it is also employed to alter the average value of the pulse train by time modulation inversely in response to filter output amplitude variations.

A complete understanding of the various features and advantages of the invention may be derived from a consideration of the following detailed description and the appended claims taken together with the attached drawing in which:

Figures 1, 2:
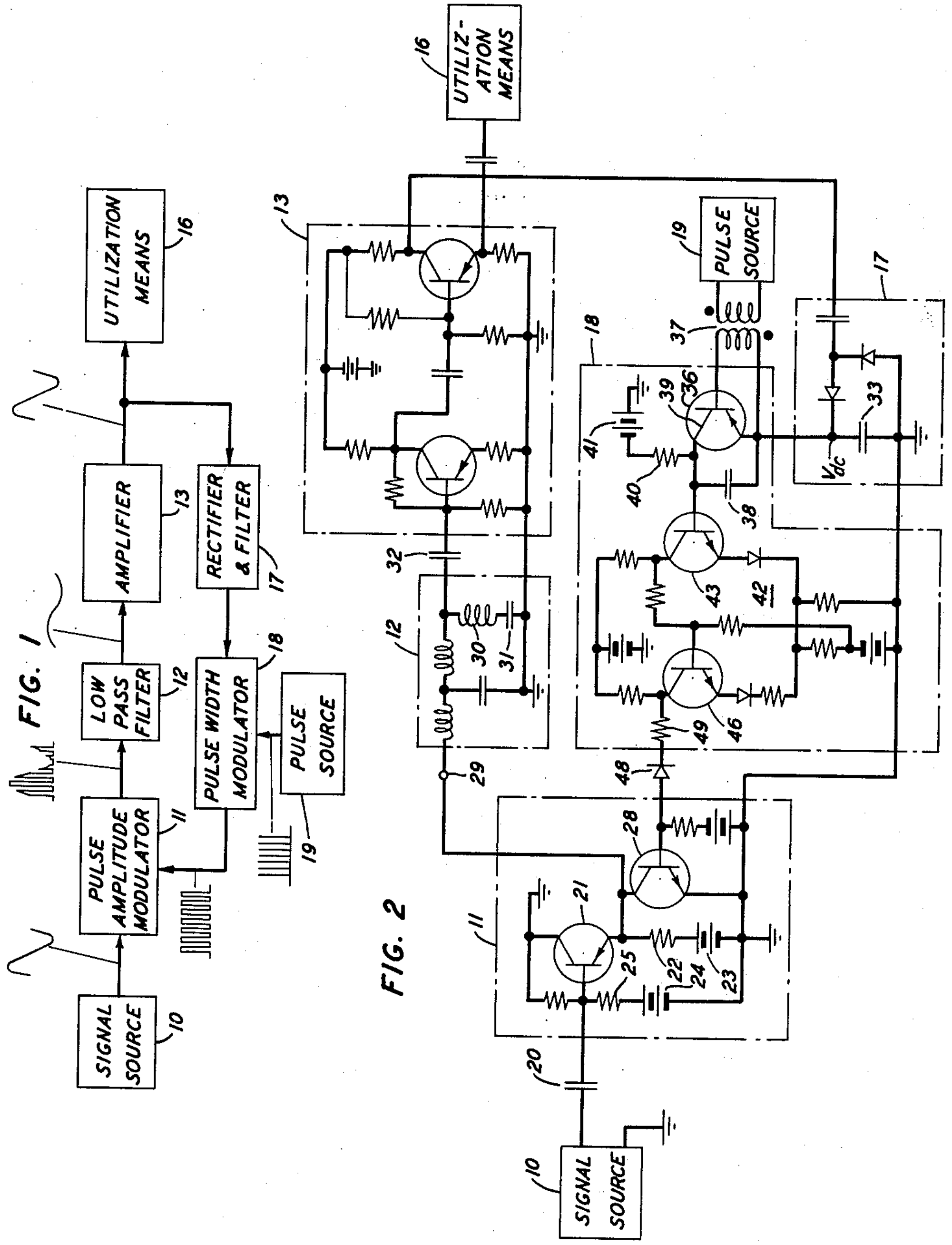
FIG. 1 is a simplified block and line diagram illustrating the invention.
FIG. 2 is a schematic diagram of one possible embodiment of the invention.

In the diagram of FIG. 1, a signal source 10 provides an electrical signal that may be a single data signal, a frequency multiplexed combination of many data signals, or any other convenient signal. The output of source 10 is coupled through a pulse amplitude modulator 11 and a low-pass integrating filter 12 to an amplifier 13. Suitable utilization means 16 are coupled to the output of amplifier 13. This same output is also applied to a rectifier and filter circuit 17 wherein a direct voltage is produced with a magnitude which is a function of the average signal amplitude in the output of amplifier 13. A pulse width modulator 18 receives the direct voltage from circuit 17 and adjusts the widths of pulses from a source 19 inversely in accordance with the magnitude of that voltage. The same direct voltage could be employed alternatively to alter the repetition rate of fixed width pulses from source 19. These pulses are then applied to modulator 11, and the signal from source 10 is amplitude modulated thereon.

The frequency of pulses from source 19 is selected to be more than twice any significant information frequency in the signal from source 10. Accordingly, filter 12 receives a doubly modulated train of pulses wherein the amplitude modulation represents the signal information to be transmitted to utilization means 16, and the width modulation represents long time changes in the average value of signal amplitudes in the output of amplifier 13. Since filter 12 is an integrating type of device, the signal envelope appearing in its output has an energy content which is representative of the information transmitted from source 10 and of any necessary amplitude corrections thereto.

Portions of the circuit of FIG. 2 corresponding to those illustrated in FIG. 1 are designated by similar reference characters. Signals from source 10 are coupled by a capacitor 20 to amplitude modulator 11. Modulator 11 includes a transistor 21 connected as a conventional emitter follower amplifier with bias supplied to the emitter and base electrodes thereof through a resistor 22, a battery 23, ground, battery 24, and a further resistor 25. A second transistor 28 is arranged in a switching type of circuit so that when it is biased into conduction its internal collector-emitter circuit provides an essentially zero impedance shunt path around resistor 22 and battery 23 from the emitter electrode of transistor 21 to ground. Thus, the output voltage of modulator 11 at terminal 29 includes pulses having amplitudes which are proportional to the signal amplitude at the base electrode of transistor 21 separated by essentially zero potential intervals corresponding to times when transistor 28 is conducting.

Filter 12 is an inductance-capacitance, T-section, low-pass filter with a coil 30 and a capacitor 31 connected in a series resonant circuit across the filter output. Coil 30 and capacitor 31 are tuned to the pulse repetition frequency of pulse source 19. A coupling capacitor 32 couples to amplifier 13 the modulated signal as modified by the combined effects of width modulation of the carrier frequency pulses and low-pass filtering thereof. Amplifier 13 is a conventional, two-stage, transistor amplifier and provides sufficient gain to compensate for losses in the overall volume control circuit.

The output from amplifier 13 is applied to the input of the rectifier and filter circuit 17 which may be arranged as shown so that there appears across the output capacitor 33 of this circuit a direct voltage $V_{dc}$ which is proportional to the peak-to-peak amplitude of the modified signal in the output of amplifier 13.

Capacitor 33 is included in the ground return path for a switching transistor 36 which is part of a sawtooth voltage generator circuit in the pulse width modulator 18. Positive pulses from source 19 are inverted by the coupling transformer 37 and are applied between the base and emitter electrodes of transistor 36 to bias this transistor for conduction in response to each pulse. When transistor 36 is conducting, a capacitor 38, which is connected between its collector and emitter electrodes, is rapidly discharged; and the collector electrode 39 of this transistor is thus temporarily clamped at the voltage $V_{dc}$. In the absence of pulses from source 19 transistor 36 is nonconducting and capacitor 38 charges through a resistor 40, a battery 41, and capacitor 33 so that the voltage with respect to ground at collector electrode 39 approaches the voltage at the negative terminal of battery 41. In this fashion there is produced between collector electrode 39 and ground a sawtooth voltage wave having the value $V_{dc}$ at the positive-going peaks thereof and having a negative-going peak value between $V_{dc}$ and the terminal voltage of battery 41. The exact value of this negative-going peak voltage is a function of the time constant of capacitor 38 and resistor 40, the pulse repetition frequency of source 19, and the magnitude of $V_{dc}$ at the particular time such peak occurs. All other factors being constant, an increase or a decrease in the magnitude of $V_{dc}$ drives the entire sawtooth voltage wave positively or negatively, respectively.

A trigger circuit 42 is also part of modulator 18 and includes two transistors 43 and 46 arranged in a conventional manner so that only one of the two transistors may conduct at any one time. Bias-supplying circuit elements in trigger circuit 42 are selected so that transistor 43 has an On-Off voltage bias level which lies between the positive-going and negative-going peaks of the output voltage from the sawtooth voltage generator. Thus, when transistor 36 is conducting transistor 43 is also conducting and transistor 46 is biased nonconducting. As capacitor 38 charges when transistor 36 is biased Off, the conducting bias on transistor 43 is reduced until it is ultimately biased Off and transistor 46 begins to conduct.

It can be seen then that since the cut off bias limit for transistor 43 lies between the peaks of a sawtooth voltage wave, any change in the average value of that wave is accompanied by a change in the conduction time of transistor 43 and by a corresponding change in the relative conducting and nonconducting times of transistor 46. Accordingly, the output of transistor 46 includes a train of pulses of variable width wherein the width at any time is a function of the magnitude of the voltage $V_{dc}$.

A resistor 47 and a reverse breakdown diode 48 couple the output of modulator 18 to the base electrode of transistor 28 in the amplitude modulator 11 to bias transistor 28 for conduction when transistor 46 is nonconducting.

It will be observed from the foregoing description of the invention with respect to one arrangement in which it has been used that the volume control function exercised by the circuit is dependent upon the combination of pulse amplitude modulation on pulses of variable duration with subsequent filtering. This type of control is inherently free from the generation of harmonics in the signal paths and it does not affect the operating point of devices in the signal transmission path. Thus, the circuit is particularly well suited for volume control functions in relatively broad band applications.

Although the invention has been described in connection with a particular embodiment thereof this presentation is merely for the purpose of illustrating the underlying principles of the invention and does not necessarily constitute the best possible utilization of these principles for all purposes. Additional embodiments and modifications of the invention in accordance with these underlying principles are included within the spirit and scope of the invention.

What is claimed is:

1. In a system for controlling the average amplitude of a varying electrical signal, a pulse amplitude modulator receiving said signal, a source of pulses occurring at a frequency which is more than two times the highest information frequency in said signal, a pulse width modulator coupling said pulses to an input of said amplitude modulator with adjustable width, filter means passing the envelope frequency range of the output of said amplitude modulator, and means responsive to signal amplitude variations in the output of said filter controlling said width modulator.

2. An automatic volume control system comprising a source of pulses of adjustable width, means amplitude modulating an electrical signal on said pulses, means integrating the output of said modulating means, and means responsive to the output of said integrating means adjusting the width of said pulses, said adjusting means comprising a sawtooth voltage generator, means adjusting the average value of said sawtooth voltage in response to long time amplitude variations in the output of said integrating means, a trigger circuit having an On-Off bias limit lying between opposite peaks of said sawtooth voltage wave, and circuit means applying the output of said trigger circuit to said amplitude modulating means.

3. The automatic volume control circuit in accordance with claim 2 in which said amplitude modulating means comprises an amplifier for said signals, bias means for said amplifier, and means disabling said bias means in response to pulses in the output of said trigger circuit.

4. The automatic volume control circuit in accordance with claim 2 in which said adjusting means comprise a voltage peak-to-peak detector.

5. The automatic volume control system in accordance with claim 2 in which a series resonant circuit tuned to said repetition frequency is connected across the output of said integrating means.

6. An automatic volume control circuit comprising a source of electric signals to be controlled, a transistor having base, collector, and emitter electrodes, means applying said signals between the base and emitter electrodes of said transistor, transistor bias means connected to said emitter electrode in said applying means and biasing said transistor for class A amplifier operation, a low-pass filter having a pass band including said signals, circuit means coupling said emitter electrode to the input of said filter, a source of pulses occurring at a frequency which is outside said pass band, a pulse width modulator receiving said pulses, means applying a portion of the output of said filter to said modulator for adjusting the widths of said pulses in response to the average value of signals in such output, and a transistor switch connected to disable said bias means once during each pulse repetition period of the output of said modulator.

7. A linear automatic volume control circuit comprising a source of signals to be controlled, a low-pass filter having a pass band including all information frequencies in said signals, a pulse amplitude modulator coupling said signals to the input of said filter, means producing a direct voltage having a magnitude which is a function of the average peak-to-peak magnitude of signals in the output of said filter, a capacitor connected in series with the output of the last-mentioned means between the terminals of a source of potential, a transistor switch having the internal collector-emitter circuit thereof connected between the terminals of said capacitor, a source of pulses occurring at a frequency which is outside said pass band, means applying said pulses between the base and emitter electrodes of said transistor for intermittently biasing said transistor into conduction to discharge said capacitor, a trigger circuit having the input thereof connected across the series combination of said capacitor and the output of said last-mentioned means, the triggering voltage of said trigger circuit being of a magnitude which is between the limits of the range of voltage variation across said combination, and means applying the output of said trigger circuit to an input of said modulator.

References Cited in the file of this patent

UNITED STATES PATENTS 2,952,812 Klein et al. ____________ Sept. 13, 1960